Figure 1:
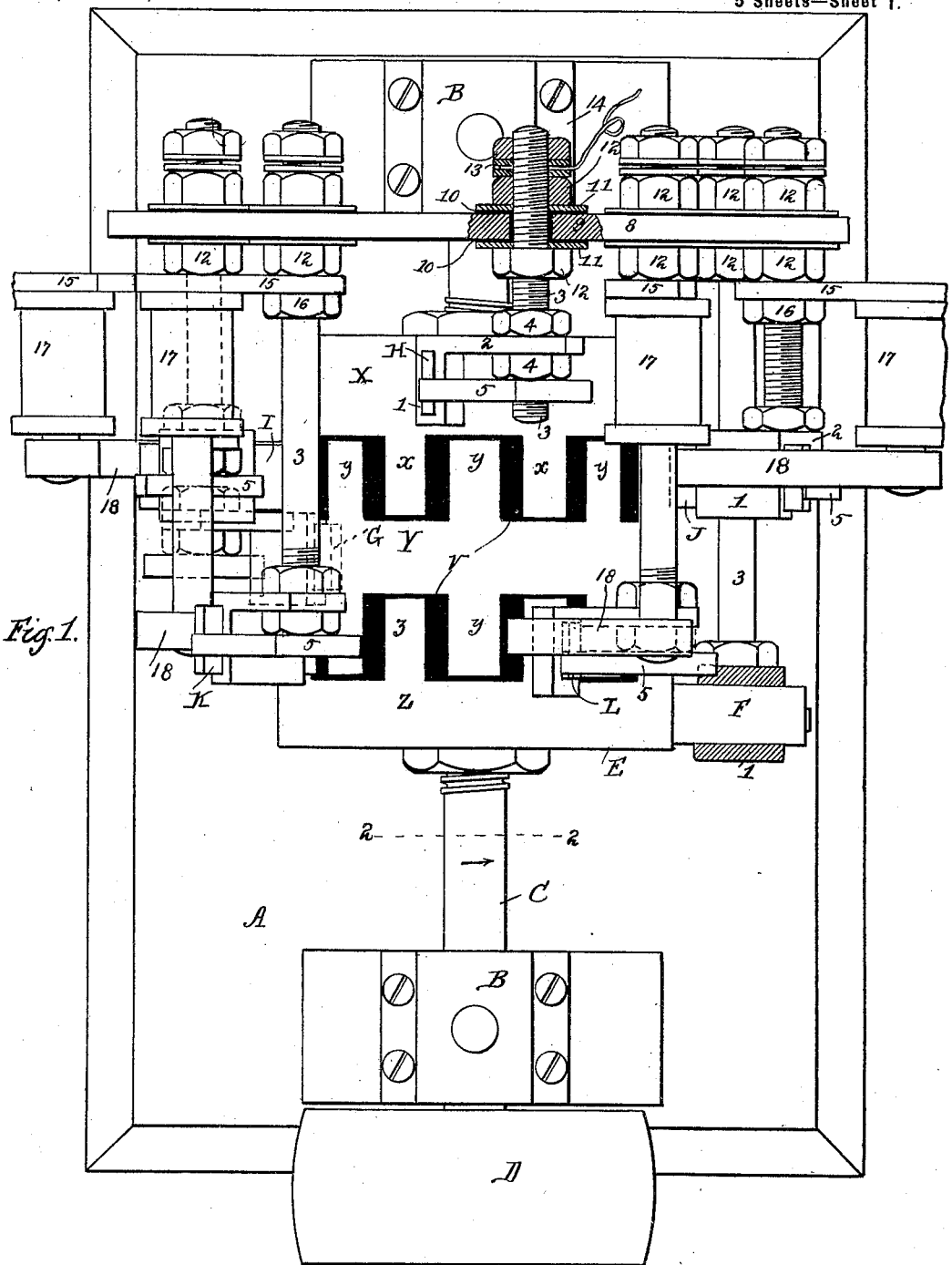

No. 653,784. Patented July 17, 1900.
C. DE W. ANDERSON.
SYSTEM OF ELECTRICAL DISTRIBUTION.
(Application filed Apr. 10, 1899.)
(No Model.) 5 Sheets—Sheet 1.

No. 653,784. Patented July 17, 1900.
C. DE W. ANDERSON.
SYSTEM OF ELECTRICAL DISTRIBUTION.
(Application filed Apr. 10, 1899.)

(No Model.) 5 Sheets—Sheet 2.

Witnesses
Wm. M. Rheem
Bertha C. Sims

Inventor
Charles DeWitt Anderson
by Gridley & Hopkins
attys.

No. 653,784. Patented July 17, 1900.
C. DE W. ANDERSON.
SYSTEM OF ELECTRICAL DISTRIBUTION.
(Application filed Apr. 10, 1899.)
(No Model.) 5 Sheets—Sheet 3.
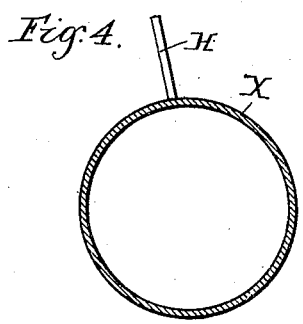
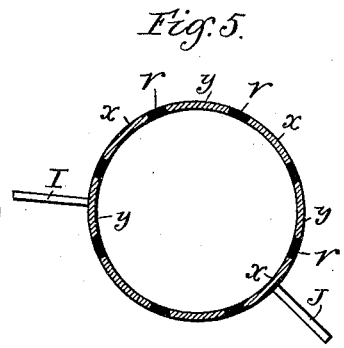
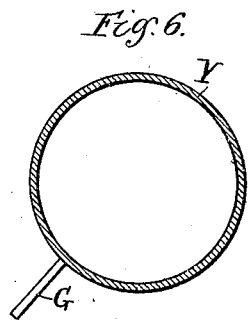
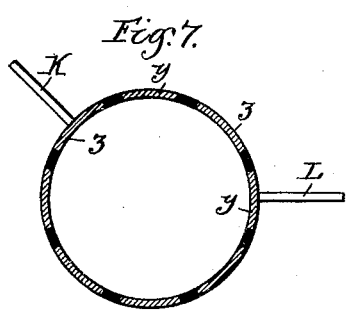
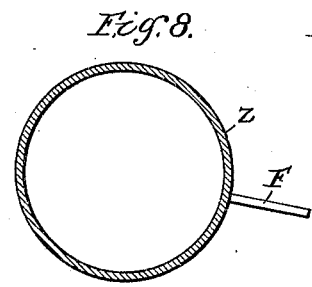
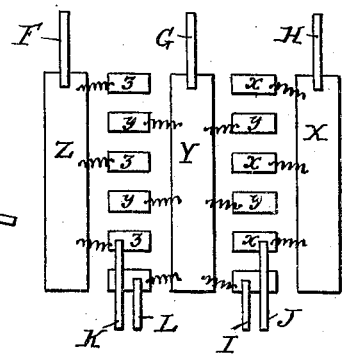
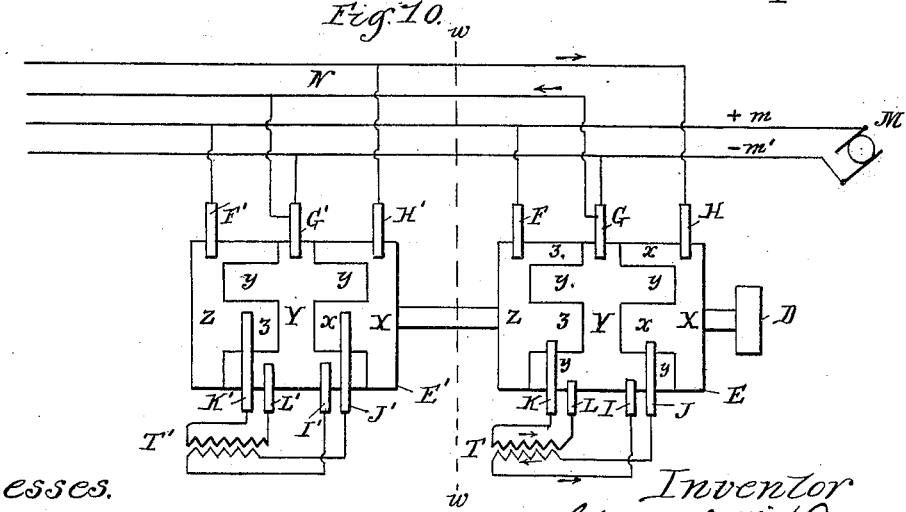
Witnesses.
Wm. M. Rheem
Bertha C. Sims.
Inventor
Charlie DeWitt Anderson
by Gridley & Hopkins
atty's.
THE NORRIS PETERS CO., PHOTO-LITHO., WASHINGTON, D. C.

No. 653,784. Patented July 17, 1900.
C. DE W. ANDERSON.
SYSTEM OF ELECTRICAL DISTRIBUTION.
(Application filed Apr. 10, 1899.)
(No Model.) 5 Sheets—Sheet 4.

Witnesses.
Wm. M. Rheem
Bertha C. Sims

Inventor
Charles DeWitt Anderson
by Gridley & Hopkins
att'ys

THE NORRIS PETERS CO., PHOTO-LITHO., WASHINGTON, D. C.

No. 653,784. Patented July 17, 1900.
C. DE W. ANDERSON.
SYSTEM OF ELECTRICAL DISTRIBUTION.
(Application filed Apr. 10, 1899.)

(No Model.) 5 Sheets—Sheet 5.

Witnesses.
Wm. M. Rheem.
Bertha C. Sims.

Inventor
Charles DeWitt Anderson
by Gridley & Hopkins
Atty's.

UNITED STATES PATENT OFFICE.

CHARLES DE WITT ANDERSON, OF CHICAGO, ILLINOIS.

SYSTEM OF ELECTRICAL DISTRIBUTION.

SPECIFICATION forming part of Letters Patent No. 653,784, dated July 17, 1900.

Application filed April 10, 1899. Serial No. 712,415. (No model.)

*To all whom it may concern:*

Be it known that I, CHARLES DE WITT ANDERSON, a citizen of the United States, residing at Chicago, in the county of Cook and State of Illinois, have invented certain new and useful Improvements in Devices for Converting Electrical Currents, of which the following is a specification.

The device which forms the subject of the present invention may with equal propriety be termed either a "transformer" or a "converter;" but since in some of its uses or arrangements the device includes a "transformer," technically so called, the device as a whole will hereinafter be called a "converter."

In the distribution of electrical currents it frequently becomes necessary to change the character of the current coming from the generator before it reaches the translating device or devices. For examples, first, it is sometimes necessary to convert a direct current of one voltage into a direct current of another voltage; or, second, to convert an alternating current of one voltage into a direct current of the same voltage; or, third, to convert an alternating current of one voltage into a direct current of another voltage; or, fourth, to convert two separate alternating currents into direct currents for a three-wire system; or, fifth, to convert the currents of a three-wire system into separate alternating currents; or, sixth, to convert an alternating current into direct currents for a three-wire system; or, seventh, to convert a direct current of one voltage into direct currents of the same or different voltage for a three-wire system.

The object of the present invention is to provide means by which any or all of these conversions may be accomplished. This object I accomplish by the use of one or more commutators, each of the construction hereinafter described. With a device having three such commutators, with their hereinafter-described accessories, any one of the aforesaid conversions may be produced by properly coupling up the brushes of the commutator or commutators, as hereinafter described, and hence, for the purposes of this application, I elect as the preferred form of the invention a device having three such commutators.

The invention consists in the features of novelty that are herein fully described.

In order that the invention may be fully understood, I will describe it with reference to the accompanying drawings, which are made part of this specification, and in which—

Figure 2:
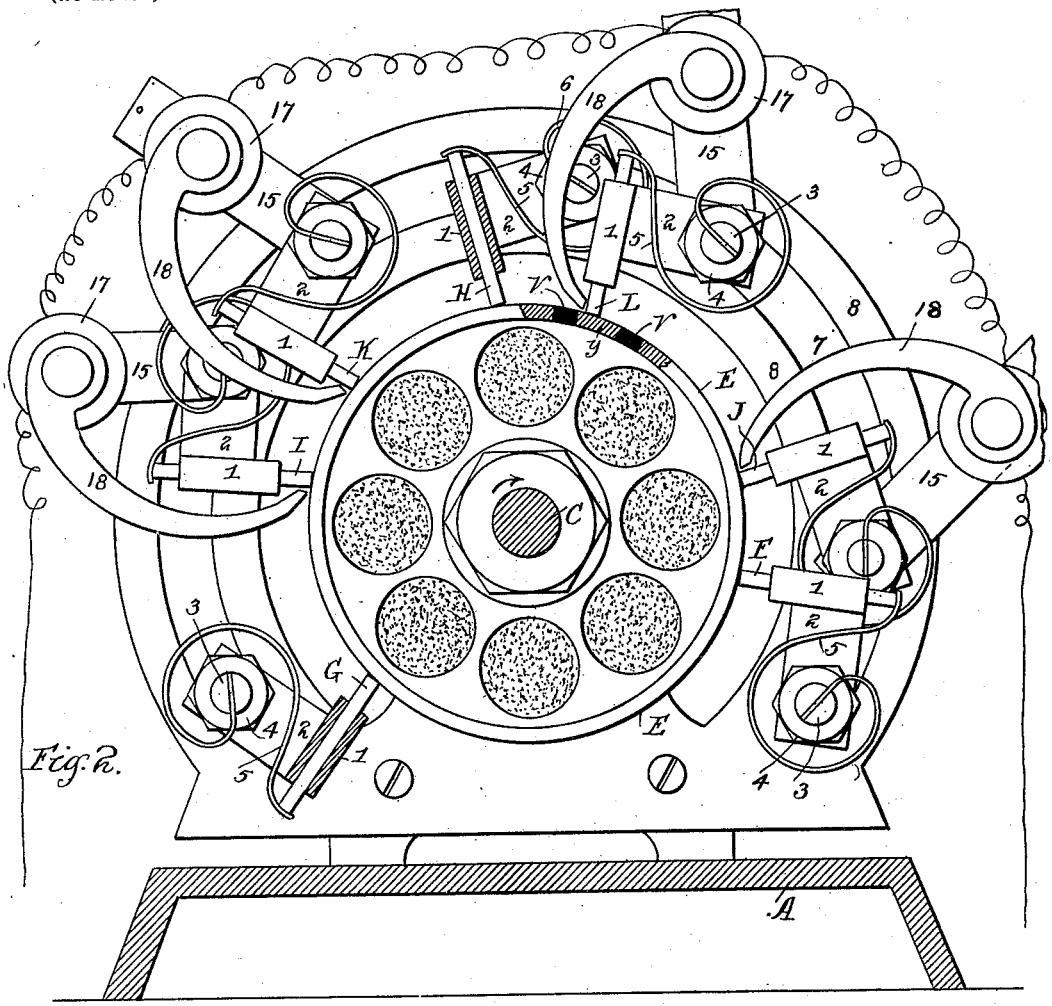
Figure 3:
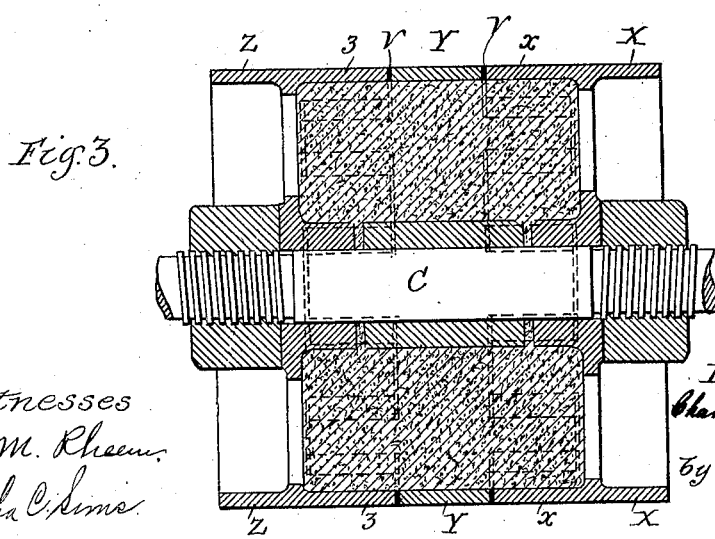
Figure 11:
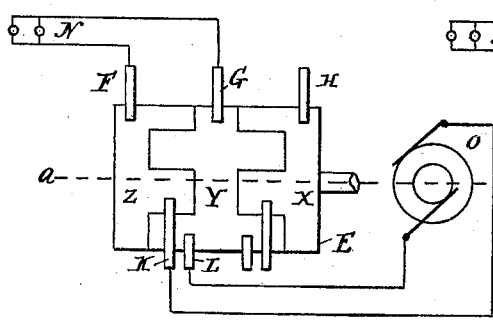
Figure 12:
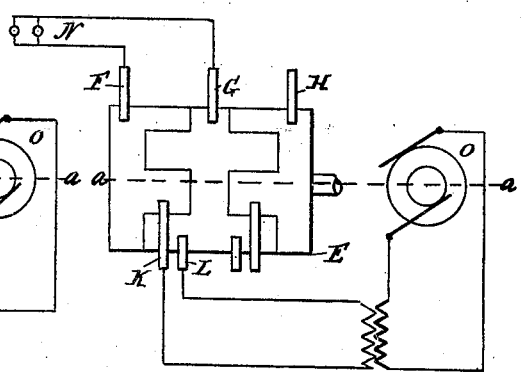
Figure 13:
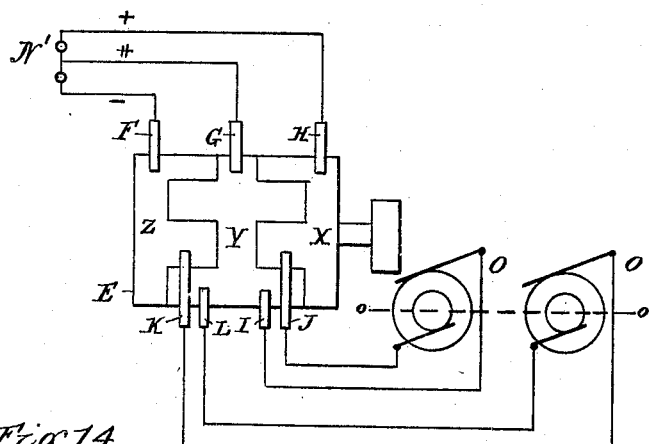
Figure 14:
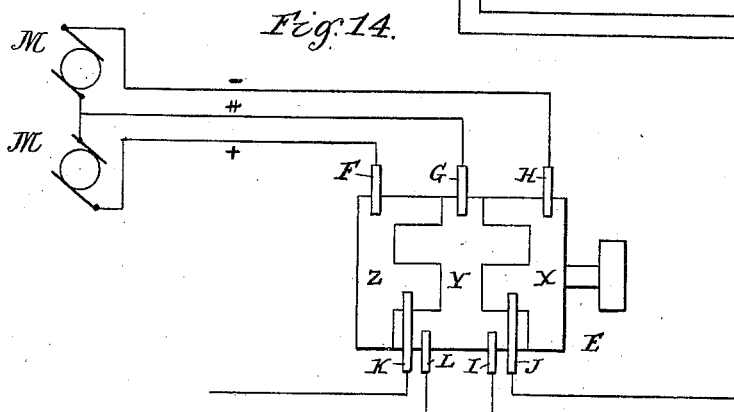
Figure 15:
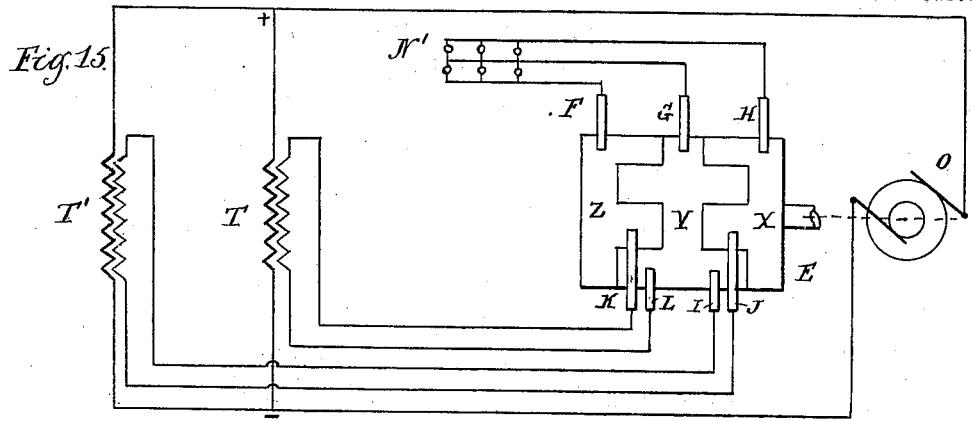
Figure 16:
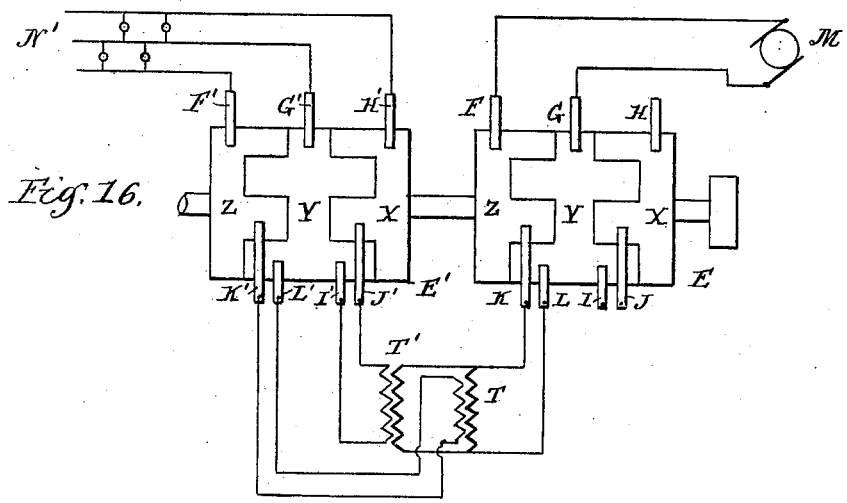
Figure 17:
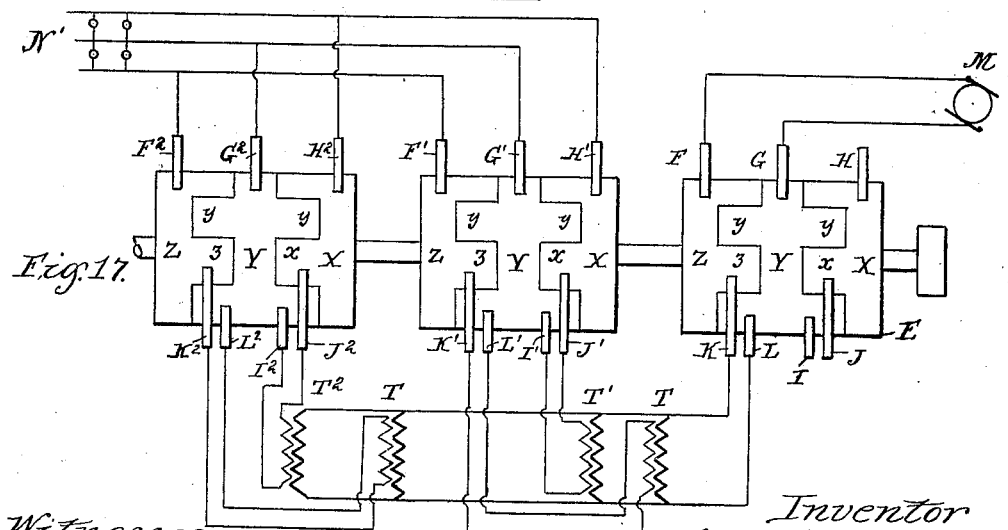

Figure 1 is a plan view of a commutator embodying some features of the invention and adapted when used without accessories other than those shown in the figure to produce the second, fourth, and fifth conversions above referred to. Fig. 2 is an end elevation thereof, the shaft of the commutator-cylinder being shown in section on the line 2 2, Fig. 1. Fig. 3 is an axial section of the commutator-cylinder. Figs. 4 to 8, inclusive, are diagrammatic sections of the commutator on the lines 4 to 8, respectively, Fig. 1, and on a somewhat-smaller scale. Fig. 9 is a diagram of the commutator. Fig. 10 is a diagram of a system in which the commutator shown in Fig. 1 and a companion commutator of similar construction are used in connection with a transformer for each of the commutators for producing the first conversion above referred to. Fig. 11 is a diagram of a system in which the commutator shown in Fig. 1 is used for producing the second conversion above referred to. Fig. 12 is a diagram of a system in which said commutator is used in connection with a transformer for producing the third conversion above referred to. Fig. 13 is a diagram of a system in which said commutator is used for producing the fourth conversion above referred to. Fig. 14 is a diagram of a system in which said commutator is used for producing the fifth conversion above referred to. Fig. 15 is a diagram of a system in which said commutator is used in connection with two transformers for producing the sixth conversion above referred to. Fig. 16 is a diagram of a system in which said commutator and a companion commutator of similar construction are used in connection with two transformers for producing the seventh conversion above referred to. Fig. 17 is a diagram of a similar system for producing the same conversion, except that a third commutator and two additional transformers are used for the purpose of securing greater uniformity in the current delivered to the working circuits.

A represents a suitable base upon which are mounted the boxes B, in which is journaled a shaft C. In some instances this shaft may be driven by a motor of any suitable construction that will give a practically-uniform speed, and in such case it may be provided with a pulley D for receiving a belt. In other instances it is necessary, for reasons hereinafter described, that the revolution of the commutator-cylinder bear a certain relation to the alternations produced by the generator. In this case intermediate gearing may be used; but in most instances it will be found more desirable to couple the shaft C and the shaft of the generator-armature together end to end or use a continuous shaft. The shaft C carries the cylinder E of the commutator. This cylinder is made up of at least three sections X, Y, and Z. Each of the sections has a circumferentially-continuous surface, and brushes F, G, and H are arranged to contact with them, respectively, as shown more clearly in Figs. 4, 6, and 8. The adjacent faces of the sections X and Y are provided with projections $x$ $y$, respectively, which are in the nature of segments arranged to interlock, and the adjacent faces of the sections Y and Z are provided with similar interlocking projections $y$ $z$, respectively, the edges of the three sections being at all points insulated from each other. For this purpose I prefer to interpose between them a non-conducting substance, as shown at V; but they may be insulated by air-spaces. Brushes I J are arranged to contact with the projections $x$ $y$, as more clearly shown in Fig. 5, said brushes being so disposed that one of them (J, for example) will contact with the projections $x$, while the other will contact with the projections $y$ at any given instant, except while passing the insulation V, this arrangement being alternately reversed as the projections are by the revolution of the commutator-cylinder successively brought under the brushes. In like manner brushes K and L are arranged to contact with the projections $y$ $z$, as more clearly shown in Fig. 7, the arrangement of the four brushes being such that two of them I L will have contact with the projections $y$, while the others will have contact with the projections $x$ $z$, as shown more clearly in Fig. 9, this arrangement being, however, successively reversed, as during the rotation of the commutator-cylinder the projections are successively brought under the brushes.

Disregarding the structural features of the commutator-cylinder and its accessories, this commutator consists (see Fig. 9) in fact and in effect of two cyclic groups of contacts $x$ $y$ $z$ $y$, three brush-terminals X, Y, and Z, means for electrically connecting one of the brush-terminals X with alternate contacts $x$ of one of the groups, means for electrically connecting another of the brush-terminals Z with alternate contacts $z$ in the other group, and means for electrically connecting the third brush-terminal Y with the other contacts $y$ of both groups. The interlocking projections of the three sections X, Y, and Z of the commutator-cylinder, as shown in Figs. 1, 2, and 3, form, in fact, the "contacts," and they will hereinafter be designated by this term, while the circumferentially-continuous portions of the commutator-cylinder form the "brush-terminals," by which is meant the terminals or contact-surfaces with which the brushes F, G, and H have contact for leading the current into or out of the commutator-cylinder. As shown in Figs. 1, 2, and 3, the several contacts are integral with the terminals, and therefore the electrical connection is direct; but an indirect connection, such as diagrammatically shown in Fig. 9, is equally within the scope of the invention, broadly considered. The brushes are preferably made of sticks of carbon of rectangular cross-sectional shape, the thickness of the brush being slightly less than the width of the insulation V between the adjacent contacts in order that in passing from one contact to the next the brush may not electrically connect them, this being clearly shown in Fig. 2, where a portion of the section Z of the commutator-cylinder is broken away in order to show the relation of one of the contacts $y$, the adjacent insulations V, and the brush L. The means for supporting and feeding forward each of the brushes being similar to that for supporting and feeding forward all of the other brushes, a description of the supporting and feeding means for one of them will be sufficient for the purposes of this specification, similar parts being indicated by similar characters of reference. The brush H, for example, is mounted to slide through a socket 1, formed at one extremity of an arm 2, the other extremity of which has an eye through which passes the threaded portion of a rod 3, and upon opposite sides of the arm 2 nuts 4 are turned onto the threaded portion of the rod, so as to clamp the arm between them and hold it in position. The extremity of the rod is provided with a diametrically-disposed notch 5, in which is secured one end of an involute leaf-spring 6, which is carried around the rod and has its free end curved outward and brought into position to bear upon the outer end of the brush H. With this arrangement the rod 3 being stationary the socket 1 is also stationary, and the brush is fed through it by means of the spring, so that its contact with the commutator-cylinder at all times is insured. The rod 3 passes through a slot 7, which is concentric with the axis of the commutator-cylinder and is formed in a ring-shaped plate 8, which is secured to the base A. Within the slot 7 the rod is surrounded by an insulating-sleeve 9, insulating-washers 10 on the rod are disposed against the opposite faces of the ring 8, metallic washers 11 on the rod are disposed against the washers 10, and nuts 12, turned onto the threaded portion of the rod, are placed against the washers 11, so that when turned up they will firmly clamp the rod to the ring 8. The disposition of the insulating sleeve and washers is such that the rod is completely insulated from the ring. Outside of the outer nut 12 a pair of washers 13 are slipped onto the rod, and outside of these is a nut 14 for forcing the washers 13 together, a bared portion of the electrical conductor being disposed between the washers 13. By this means the current is led to the rod 3 and through the rod 3, arm 2, and socket 1 to the brush H. It will be understood that the length of the rod used for any given brush will depend upon the distance of the brush from the ring 8. Each of the brushes I, J, K, and L is provided with means for preventing sparking. As the means for this purpose applied to the several brushes is similar, a description of one of them will be sufficient. 15 is an arm having at one end an eye fitting upon the rod 3, and 16 is a nut turned onto the rod and clamping the arm 15 against the nut 12. Carried by and insulated from the arm 15 is an electromagnet 17, the core of which carries a pole-piece 18 in the nature of a curved arm, which terminates at its extremity in proximity to the rear side of the brush. The several electromagnets are coupled in series by a wire 19, and when energized the effect is to prevent sparking. A commutator thus constructed used alone or in connection with one or more companion commutators of similar construction and with or without one or more transformers, as may be necessary, may be used for making the conversions above described.

In Fig. 10 is shown an arrangement by which a direct current of one voltage may be converted into a direct current of any other desired voltage. To do this, the positive and negative wires $m$ and $m'$ of a direct-current generator M are connected with the brushes F and G, respectively. The brushes K and L are connected, respectively, with the terminals of the primary coil of a transformer T, and the terminals of the secondary coil of this transformer are connected with the brushes I and J, respectively. The wires of the working circuit N are connected with the brushes G and H, respectively. With the parts in the position shown in Fig. 10 the current from the generator passes through brush F into section Z, from the contact $z$ thereof through brush K to one terminal of the primary coil of the transformer, from the other terminal of said coil through brush L to section Y, and thence through brush G back to the generator. The transformed current from the transformer passes through brush I into the section Y of the transformer, thence through brush G back to the working circuit, returning through the brush H to section X, and thence through brush J back to the transformer. Thus by using a proper transformer the voltage of the current may be changed. By this same arrangement an alternating current of one voltage may be converted into an alternating current of any other desired voltage. With only so much of the apparatus as is shown at the right-hand side of the dotted line W interruptions in the flow of the current will occur, as the insulations V are successively brought under the brushes, and in order to avoid this and deliver to the working circuit a uniform and uninterrupted current I use a second commutator E' and a second transformer T', coupled precisely as the commutator E and transformer T are coupled, the only difference between the two commutators being that the brushes of one of them are arranged a little in advance of the brushes of the other, the difference in their positions being approximately equal to the thickness of the insulators V. With this arrangement after the brushes of one commutator leave the contacts of a given name and reach the insulation between said contacts and the next in succession the other set of brushes will still be in contact with the contacts of their commutator-cylinder of said given name and will remain in such contact until the first set of brushes has passed the insulation and reached the succeeding contacts of different name. This arrangement of the commutator-cylinder and brushes is to be observed wherever two commutators are used for the purpose of preventing an interruption in the current delivered to the working circuit. In this use of the device the relative speed of the commutator-cylinder and the armature of the generator is immaterial, and hence the commutator-cylinder may be driven by any means that will give it a practically-uniform and sufficiently-high speed.

To convert an alternating current into a direct current without changing the voltage, the terminals of an alternating-current generator O are connected to the brushes K L, respectively, and the current for the working circuit N is taken off by the brushes F and G, as shown in Fig. 11. In order to do this, the changes produced by the commutator E must be simultaneous with the changes or alternations produced by the generator. The simplest way of accomplishing this result is to mount the commutator-cylinder and the armature of the generator upon the same shaft, as indicated by the dotted line $a$, and to provide the commutator-cylinder with as many contacts arranged in the path of the brushes K and L as the generator has poles.

Where it is desired to change the voltage, a transformer T is arranged between the generator and the commutator, as shown in Fig. 12, the arrangement being otherwise as described with relation to Fig. 11.

To convert two separate alternating currents into direct currents for a three-wire system, the arrangement shown in Fig. 13 may be used. The two currents to be changed should have the same number of alternations per minute, and this may be accomplished by the use of generators of similar construction having their armatures mounted upon the same shaft, as indicated by the dotted line o. The wires from one of these generators are connected with the brushes I and J, respectively, and the wires from the other are connected with the brushes K and L, respectively. The converted current is taken off through the brushes F, G, and H, the brush F being connected with the negative wire, the brush G with the neutral wire, and the brush H with the positive wire.

To convert the currents of a three-wire system into separate alternating currents, the arrangement shown in Fig. 14 may be used. Here the three wires of a system supplied by two generators M are connected with the brushes F, G, and H. One alternating current may be taken off by the brushes I J and another by the brushes K L, and these two separate currents may then be transformed to the desired voltage.

To convert an alternating current from a single alternating-current generator, the arrangement shown in Fig. 15 may be used. Here the primary coils of two transformers T and T' are arranged in multiple in the circuit of the alternating-current generator O. The secondary coil of the transformer T has its terminals connected with the brushes K and L, respectively, and the secondary coil of the transformer T' has its terminals connected with the brushes I J, respectively, the arrangement being such that the two secondary coils are practically in series. The current for the three-wire working circuits N' is taken off by the brushes F, G, and H.

To produce current for a three-wire system from a single direct-current generator, the arrangement shown in Fig. 16 may be used. Here the terminals of the generator M are connected with the brushes F and G, respectively, and an alternating current is taken off by the brushes K and L. This current is passed through the primary coils of two transformers T T', arranged in multiple. The secondary coil of the transformer T has its terminals connected with the brushes K' L' of a companion commutator E', and the secondary coil of the transformer T' has its terminals connected with the brushes I' J' of said companion commutator. The transformed alternating currents are again converted into direct currents by the commutator E' and led off to the three-wire system N' by the brushes F' G' H'. In order to avoid the interruptions in the current supplied to the working circuits, a third commutator $E^2$ and a second set of transformers T $T^2$ are used, as shown in Fig. 17, the current in this case being taken off by the brushes F' G' H' $F^2$ $G^2$ $H^2$.

What I claim, and desire to secure by Letters Patent, is—

1. A commutator having in combination two cyclic groups of contacts, an electrical connection with alternate contacts of one group, an electrical connection with alternate contacts of the other group, an electrical connection with the remaining contacts of both groups, and a plurality of brushes for each group contacting with dissimilar contacts, substantially as described.

2. A commutator having two cyclic groups of contacts, alternate contacts of one group being electrically connected and having a common brush-terminal, alternate contacts of the other group being electrically connected and having a common brush-terminal, and the remaining contacts of both groups being electrically connected and having a common brush-terminal, brushes contacting with said terminals, and a plurality of brushes for each group of contacts, contacting with dissimilar contacts, substantially as set forth.

3. In a device for converting electrical currents, the combination with a commutator having two cyclic groups of contacts, of a circuit completed through the commutator, each of the two sides of said circuit, upon opposite sides of the commutator, having terminals electrically connected with dissimilar contacts of one group, and a second circuit completed through the commutator, each of the two sides of said circuit, upon opposite sides of the commutator, having terminals electrically connected with dissimilar contacts of the other group, substantially as set forth.

4. In a device for converting electrical currents, the combination with a commutator having two cyclic groups of contacts, of a circuit completed through the commutator, one side of said circuit having a terminal in continuous electrical connection with alternate contacts of one group, and a terminal having continuous electrical connection with the remaining alternate contacts of said group, and the other side of said circuit having terminals in electrical connection with alternate contacts of said group, and a second circuit having a terminal in continuous electrical connection with alternate contacts of the other group and a terminal having continuous electrical connection with the remaining alternate contacts of said group, and the other side of said second circuit having terminals in electrical connection with dissimilar contacts of said group, substantially as set forth.

5. In a device for converting electrical currents, the combination with a commutator having two cyclic groups of contacts, of two circuits completed through the commutator, said circuits including a wire having terminals electrically connected with alternate contacts of one group, means for producing an alternating current in said wire, a second wire having terminals electrically connected with alternate contacts of the other group, and means for producing an alternating current in said second wire, substantially as set forth.

6. In a device for converting electrical currents, the combination with a commutator having two cyclic groups of contacts, of a three-wire system completed through the commutator, said system having a positive wire electrically connected with alternate contacts of one group, a negative wire electrically connected with alternate contacts of the other group, a neutral wire electrically connected with the remaining alternate contacts of both groups, and electrical connections with the commutator through which the circuits are completed, substantially as set forth.

7. In a device for converting electrical currents, the combination with a commutator having two cyclic groups of contacts, of a three-wire system completed through the commutator, said system having a positive wire electrically connected with alternate contacts of one group, a negative wire electrically connected with alternate contacts of the other group, a neutral wire electrically connected with the remaining alternate contacts of both groups, and two wires carrying alternating currents, one having its terminals electrically connected with dissimilar contacts of one group and the other having its terminals electrically connected with dissimilar contacts of the other group, substantially as set forth.

8. In a device for converting electrical currents, the combination with a commutator having two cyclic groups of contacts, of a three-wire system completed through the commutator, said system having a positive wire electrically connected with alternate contacts of one group, a negative wire electrically connected with alternate contacts of the other group, a neutral wire electrically connected with the remaining alternate contacts of both groups, a wire having its terminals electrically connected with dissimilar contacts of one group, a wire having its terminals electrically connected with dissimilar contacts of the other group, and means for supplying the two wires last aforesaid with alternating currents, substantially as set forth.

9. In a device for converting a continuous electrical current of a two-wire circuit into a continuous electrical current for a three-wire circuit, the combination of means for changing the primary continuous current into two separate alternating currents, and means for changing these two separate alternating currents into direct currents for a three-wire system, substantially as set forth.

10. In a device for converting electrical currents and supplying a continuous current to a three-wire system, the combination of a commutator having two cyclic groups of contacts, the positive wire of the three-wire system having its terminal electrically connected with alternate contacts of one group, the negative wire having its terminal electrically connected with alternate contacts of the other group, and the neutral wire having its terminal electrically connected with the remaining contacts of both groups, two transformers, means for supplying their primary coils with an alternating current, means for electrically connecting the secondary coil of one transformer with dissimilar contacts of one group, means for connecting the terminals of the secondary coil of the other transformer with dissimilar contacts of the other group, and means for alternately reversing the contacts with the secondary coils, substantially as set forth.

11. In a device for converting a continuous electrical current of a two-wire circuit into a continuous electrical current for a three-wire system, the combination of a commutator having two cyclic groups of contacts, the positive wire of the three-wire system having its terminal electrically connected with alternate contacts of one group, the negative wire having its terminal electrically connected with alternate contacts of the other group, and the neutral wire having its terminals electrically connected with alternate contacts of both groups, a second commutator having a cyclic group of contacts, a primary circuit supplied with a direct current, having one of its terminals connected with alternate contacts of said group, and its other terminal connected with the remaining contacts of said group, a circuit having its terminals elecally connected with dissimilar contacts of said group, means for alternately reversing these contacts, whereby the direct current is changed into an alternating current, transformers having their primary coils arranged in multiple in this alternating-current circuit, means for electrically connecting the terminals of the secondary coil of one transformer with dissimilar contacts of one of the two groups first aforesaid, means for electrically connecting the terminals of the secondary coil of the other transformer with dissimilar contacts of the other of said groups, and means for alternately reversing the contacts with the secondary coils of the transformers, all of the reversals aforesaid being simultaneous, substantially as set forth.

CHARLES DE WITT ANDERSON.

Witnesses:
L. M. HOPKINS,
B. C. SIMS.